Aug. 3, 1965  A. O. HOLDO  3,198,949
LINE FOLLOWING APPARATUS FOR A GRAPHICAL RECORDER
INCLUDING SYMMETRICAL PHOTOCELL ARRANGEMENTS
Filed Nov. 21, 1960  3 Sheets-Sheet 1
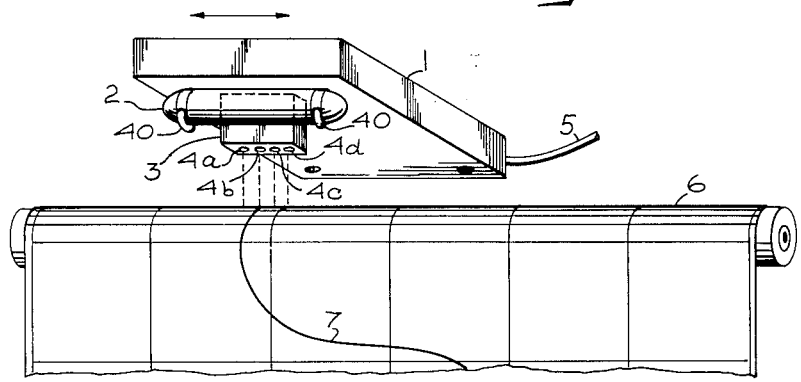
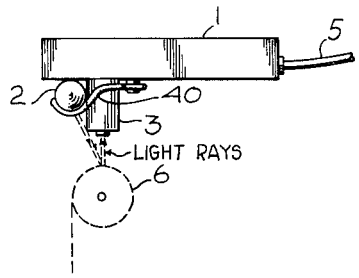
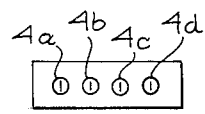
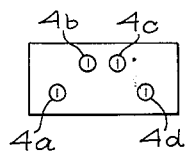
ANDRES O. HOLDO
INVENTOR.
BY Fraser and Bogucki
ATTORNEYS Aug. 3, 1965  A. O. HOLDO  3,198,949
LINE FOLLOWING APPARATUS FOR A GRAPHICAL RECORDER
INCLUDING SYMMETRICAL PHOTOCELL ARRANGEMENTS
Filed Nov. 21, 1960  3 Sheets-Sheet 2

ANDRES O. HOLDO
INVENTOR.

BY Fraser and Bogucki

ATTORNEYS.

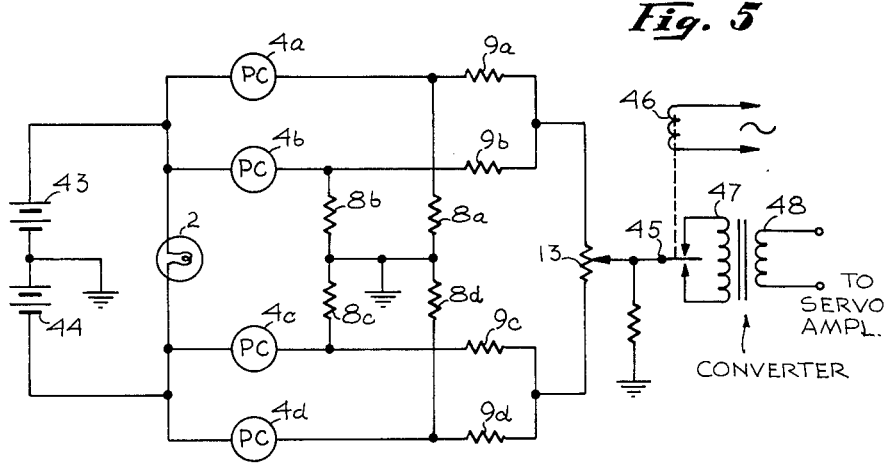
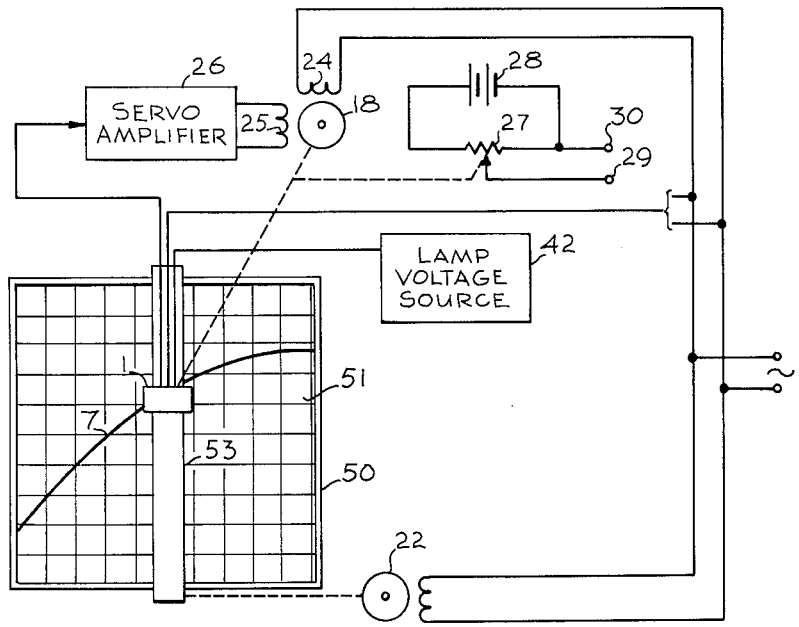
ANDRES O. HOLDO
INVENTOR.
BY Fraser and Bogucki
ATTORNEYS

United States Patent Office 3,198,949
Patented Aug. 3, 1965

3,198,949
LINE FOLLOWING APPARATUS FOR A GRAPHICAL RECORDER INCLUDING SYMMETRICAL PHOTOCELL ARRANGEMENTS
Andres O. Holdo, San Gabriel, Calif., assignor to F. L. Moseley Co., a corporation of California
Filed Nov. 21, 1960, Ser. No. 70,502
16 Claims. (Cl. 259—202)

This invention relates to an automatic line following apparatus and more particularly to a line sensing device for use with a graphical recorder.

Recording equipment of the type which automatically draws a line or curve representative of a function that is desired to be plotted is well know. Such equipment produces a curve which illustrates the variations in a signal being monitored by the recorder. Oftentimes it is desirable to reproduce the signal variations represented by a particular curve. In such cases an arrangement for performing the inverse of the recording process is desirable. Such a situation may arise with respect to curves that are drawn by hand as well as those which have been produced by an automatic recorder. For example, one may wish to present to a computer signals which are representative of an empirically derived function of two variables. Instead of calculating mathematical approximations for such a relationship, the actual curve may be presented to the line following apparatus so that voltages representative of the curve are provided.

One arrangement for providing an output voltage representative of a curve being scanned is disclosed in United States patent application, Serial No. 46,249, now Patent No. 3,050,669, of Francis L. Moseley and Andres O. Holdo, entitled "Optical Curve Following System." This arrangement causes a line to be scanned mechanically and the resultant signal is filtered and amplified for presentation to a servo amplifier controlling the position of the line following head. This invention is directed to a new and improved line following system which does not require moving parts for the scanning of the line, and which generates a signal which may be presented directly to the servo amplifier without amplification.

It is an object of this invention to provide an improved line sensing device for an automatic curve following apparatus.

It is an additional object of this invention to provide a line sensing device without moving parts for scanning the line.

It is a further object of this invention to provide a line sensing device capable of generating a phase responsive signal which may be applied directly to a servo amplifier.

Briefly, in accordance with the invention, a line sensing device, or line following head, is provided which includes a source of illumination and a bank of four photocells arranged to respond to the light reflected from an adjacent sheet of graph paper. The line sensing device may advantageously be part of a system which controls the position of the device both with respect to the graph paper and to a reference position, generating output signals indicative of the position of the device relative to the reference. In one preferred arrangement the line sensing device of the invention is employed in an automatic line recorder in place of the recording pen thereof. For example, a strip chart system may be employed wherein a strip chart on which a line or curve has been drawn is driven at a uniform rate past a bar on which the line sensing device is mounted. The line sensing device is movable along the bar in a direction transverse to the direction of travel of the paper. The motion of the device is controlled by signals generated therein as it follows the line on the paper.

In the described arrangement, a single lamp, centrally located in the line sensing device, provides illumination for a section of the paper positioned underneath the line following head. Light reflected from the paper is directed to four spatially separated photocells and, depending upon the location of the scanned line segment relative to the respective photocells, affords spearate control of the individual impedances thereof. The photocells are divided into two pairs and connected in an impedance circuit which is symmetrical with respect to the pairs of photocells and to which a reference potential is applied. Thus when the line sensing device is centered over the scanned line segment, the currents developed in the respective photocell paths are balanced against each other so that no resultant signal is generated. If, however, the line sensing device becomes displaced from a central position over the scanned line segment, a signal corresponding in magnitude and polarity to the degree and direction of displacement, respectively, is applied to a servo amplifier which drives the line following head positioning motor to cause it to restore the line sensing device directly over the scanned line segment.

In one specific embodiment of the invention the four photocells of the line following head are positioned in a straight line and equally spaced apart. In another embodiment the photocells are positioned by pairs with respective pairs being aligned in slightly different positions relative to the direction of travel of the paper being scanned.

In one arrangement of the invention, an alternating potential is applied to the respective pairs of photocells in an out-of-phase relationship. This potential is derived from opposite ends of the secondary winding of a line transformer which has a center tap connected to ground. The symmetrical arrangement of the photocell circuit advantageously achieves a push-pull effect insofar as the resultant control signal is concerned, thus improving the sensitivity of the line sensing device. A potentiometer is also provided at the output of the circuit to permit adjustment of the balancing point of the line following head by the operator.

A variation of the previously described arrangement of the invention employs a reference potential derived from a pair of oppositely poled direct current sources having their intermediate point connected to ground. The output signal from the photocell circuit may be converted to an alternating signal for application to the reference winding of a head positioning servomotor.

A more complete understanding of the invention may be had from a consideration of the following detailed description taken in conjunction with the drawings, in which:

FIG. 1 is a perspective view of a portion of a line following apparatus illustrating one specific embodiment of a line following head in accordance with the invention;

FIG. 2 is a right hand side view of the arrangement depicted in FIG. 1;

Figure 4:
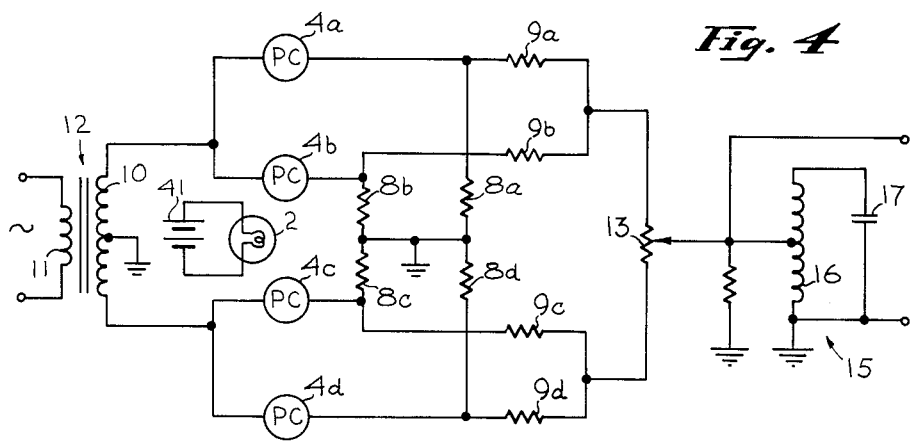
Figure 6:
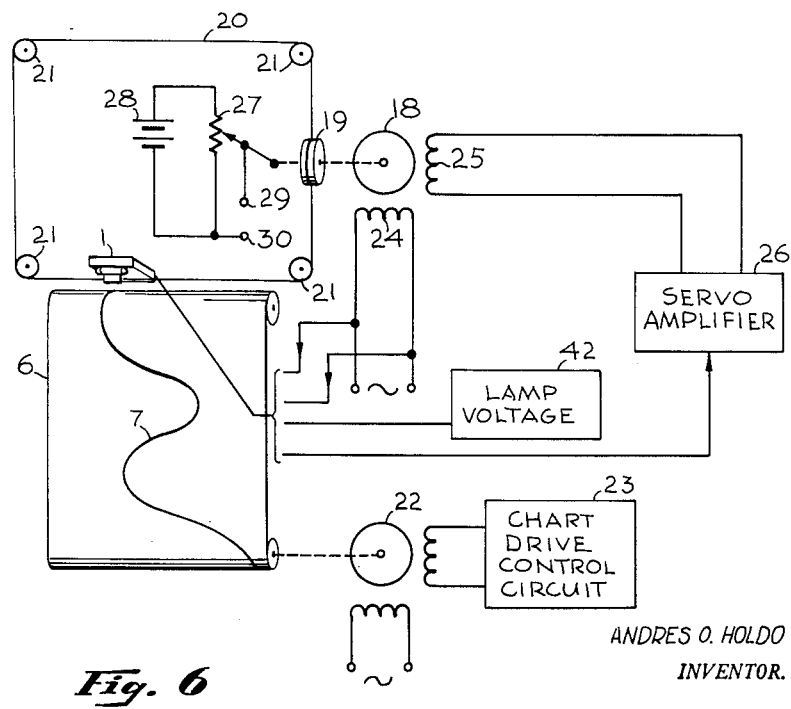

FIGS. 3(A) and 3(B) illustrate two different configurations of the photocells in the line following head in accordance with the invention;

FIG. 4 is a schematic representation of one arrangement of the photocell circuit of the line following head of FIG. 1;

FIG. 5 is a schematic representation of a second arrangement of the photocell circuit of the line following head of FIG. 1;

FIG. 6 is a combination block and schematic diagram of a system incorporating the invention; and FIG. 7 is a combination block and schematic diagram of a second system incorporating the invention.

In the drawings, similar elements have been given like designations throughout. In FIG. 1 there is shown a perspective view of a portion of a line following system in accordance with the invention. The head 1 carries on its underside a lamp 2 and a bank 3 of photocells 4a–4d. Electrical connection between the head 1 and associated apparatus is afforded by means of an electrical cable 5. The head 1 is shown positioned adjacent a rolled chart 6 bearing a line 7. Light from the lamp 2 is directed to the chart 6 in an area encompassing a segment of the line 7. From there it is reflected to the photocells 4a–4d and so controls the individual impedances thereof. FIG. 2 is a side view of the arrangement of FIG. 1 and illustrates the way in which the lamp 2 is held in position by a spring clip 40.

FIG. 3 illustrates two particular arrangements for the photocells 4a–4d of the line following head of FIG. 1. The arrangement of FIG. 3(A) shows the cells 4a–4d in a straight line which in use is positioned transverse to the direction of relative motion between the paper and the line following head. The arrangement of FIG. 3(B) shows a somewhat different configuration of the photocells 4a–4d which has proven capable of following a line of steeper slope than the straight line arrangement of FIG. 3(A).

FIG. 4 is a schematic representation of one arrangement of a photocell circuit in accordance with the invention for the head 1 of FIG. 1. In FIG. 4 each photocell 4a–4d is respectively connected to a corresponding one of resistors 8a–8d and 9a–9d. An alternating current (A.-C.) voltage of reference phase is applied to the photocells 4a–4d from a transformer secondary winding 10 having its center tap connected to a reference potential (in this case, ground). The resistors 8a–8d are also connected to ground and thus the circuit of FIG. 4 provides a symmetrical arrangement with respect to ground with the photocells 4a–4d arranged in pairs on opposite sides thereof. The primary winding 11 of the transformer 12 is connected to the same source of A.-C. voltage which is employed as a reference for the head positioning mechanism (FIG. 6). A potentiometer 13 is connected across the respective common connections of the resistors 9a, 9b, 9c and 9d in order that the zero reference point of the line following head may be controlled with respect to the scanned line segment. The lamp 2 is connected to a direct current potential source represented by the battery 41 which maintains a steady illumination from the lamp 2. A filter 15 comprising an inductance 16 and a capacitor 17 at the pick-off arm of the potentiometer 13 is tuned to the line frequency so that maximum response is afforded for signals of this frequency.

In accordance with one aspect of the invention, the values of the resistors 9a–9d are selected to provide an improved response characteristic for the line follower apparatus. Resistors 9a and 9d, which are in series with those photocells 4a and 4d most remote from the center position of the line following head, may have approximately one-half the resistance value of resistors 9b and 9c. Thus a correction signal of greater magnitude is provided when either photocell 4a or 4d is over the line than when the head is more nearly centered. As a result, the correction signal from the photocell circuit of the invention, in accordance with one aspect thereof, is arranged to vary with the magnitude of deviation from the true position of the line following head with respect to the line being tracked.

Operation of the invention may be best understood by reference to the circuit of FIG. 4. It will be noted that the outputs of the respective photocells 4a–4d are connected to opposite ends of the transformer winding 10 and thus carry the A.-C. therefrom in opposite phase polarities. Photocells 4b and 4c are similarly connected with respect to each other. Thus when the scanned line segment is positioned directly between the photocells 4b and 4c, the impedances of the cells 4a and 4d are equal and the impedances of the cells 4b and 4c are equal so that a balanced situation exists and the A.-C. voltage across the potentiometer 13 is zero. If, however, the line deviates from the center position, a condition of unbalance exists.

Assume that the line is positioned between the photocells 4a and 4b. Photocells 4a and 4b thus receive less reflected light from the lamp 2 than do the photocells 4c and 4d. Accordingly, the photocells 4c and 4d present a lower impedance than do the photocells 4a and 4b and consequently the movable arm of the potentiometer 13 receives a signal in phase with the voltage from the lower end of the transformer winding 10 and with a magnitude proportional to the degree of deviation from the center position. If, however, the line becomes positioned near the cells 4c and 4d, those photocells 4a and 4b receive more illumination, thus providing a reduced impedance, and the arm of the potentiometer 13 receives a signal derived from the upper end of the transformer winding 10. Thus it can be seen that an output signal is developed which is related in phase to the position of a scanned line segment relative to the position of the photocells 4a–4d and in magnitude to the degree of deviation from a central position.

FIG. 5 represents schematically a second arrangement of the invention for the head 1 of FIG. 1. In FIG. 5 the A.-C. source of FIG. 4 is replaced by a D.-C. source providing balanced voltages on opposite sides of ground, represented by the batteries 43 and 44 which are connected in reverse polarity between corresponding pairs of the photocells 4a–4d and ground. The lamp 2 is shown connected across the batteries 43 and 44. The output arm of the balancing potentiometer 13 is connected to a converter which is shown comprising a vibrating reed 45 driven by a coil 46 between opposite terminals of a transformer primary winding 47. As a result, an A.-C. signal is presented at the secondary winding 48 which corresponds in magnitude and phase to the D.C. signal present at the potentiometer 13, which in turn corresponds to the deviation of the line following head from the line being tracked.

In FIG. 6 there is shown a system employing the line following head of the invention. This figure shows the head 1 adjacent a strip chart 6 carrying a line 7 to be followed. The lateral position of the head 1 is controlled by a servomotor 18 by means of a motor shaft drive pulley 19, a belt 20 and idler pulleys 21. The strip chart 6 is moved at a predetermined rate by a second servomotor 22 which is controlled by a chart drive control circuit 23 capable of providing various driving signals as selected by the operator in order to achieve the desired velocity of motion of the chart.

The servomotor 18 is energized by windings 24 and 25. The winding 24 is connected to a source of reference A.-C. voltage which also is applied to the head 1 and furnishes the reference voltage for the transformer 12 in FIG. 4. The output of the photocell circuit is fed directly to a servo amplifier 26 which energizes the control winding 25 and may be the same servo amplifier employed when the system is utilized as an automatic line recorder. Thus it is clear that an arrangement of maximum utility is afforded in which the line following head 1 may be readily substituted for the recording head commonly used in an automatic line recorder. Also, in FIG. 6, a potentiometer 27 is shown having a movable arm which is driven by the servomotor 18. A D.-C. voltage source 28 is connected to the potentiometer 27 and output terminals 29 and 30 are arranged so that a voltage is provided thereat corresponding to the position of the movable arm of the potentiometer 27. Since this potentiometer arm is driven by the servomotor 18 which also determines the position of the head 1 over the line 7, it will be appreciated that the voltage at the terminals 29 and 30 corresponds to the function represented by the particular segment of the line 7 being tracked.

While the invention has thus far been described in conjunction with a strip chart as the line carrying medium, it will be understood that the invention is not to be limited to such a particular application. FIG. 7 depicts a particular arrangement in which the invention may be employed to advantage in connection with an "X–Y recorder." In the arrangement of FIG. 7, a table 50 of an X–Y recorder is shown on which is mounted a medium such as a sheet of graph paper 51 bearing a line 7 which is to be tracked. Mounted transversely on the table 50 is a movable carriage 53 which is mechanically linked to the servomotor 22 controlled by an X-axis control circuit 52 so that it may be moved across the table 50 in the horizontal or X-axis direction. The line following head 1 is shown positioned on the carriage 53 and is movable in the vertical or Y-axis direction under the control of the servomotor 18 which is mechanically linked to the head 1.

In the operation of the arrangement of FIG. 7 the carriage 53 is moved conventionally from left to right in accordance with a particular horizontal control function selected by the operator and generated by the circuit 52. The line following head 1 moves in a transverse direction following the line 7 in the manner already described. The associated potentiometer mechanically linked to the servomotor 18 produces an output voltage at the terminals 29, 30 which corresponds to the function represented by the line 7.

While it is clear that the line following head of the invention performs a particularly advantageous function where employed in conjunction with line recorders and function generating apparatus, it should be understood that its utility is not limited to such applications. It is not required that a circuit be associated therewith in order to produce an output voltage corresponding to the particular line being followed.

Apart from its use in conjunction with line recording apparatus as a function generator, it may be employed wherever it is desired to track a line for whatever purpose. Thus any arrangement in which it is desired to develop relative motion between a line bearing medium and a specific mechanism, which motion is to be guided by the line, may employ the invention to advantage. Specific uses of the invention other than those described in detail above will occur to those skilled in the art within the spirit and scope of the invention.

Although particular arrangements of line following apparatus have been described above in order to illustrate the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A line following apparatus for generating signals of particular polarity and magnitude in accordance with the position of a line following element relative to a particular line segment comprising a source of illumination, a plurality of photocells positioned to receive light emanating from said source of illumination, means for providing a reference potential at a circuit midpoint between said photocells, means electrically connecting said photocells in a circuit having an electrically symmetrical arrangement with respect to the reference potential, means for applying potentials of equal magnitude but opposite polarity to corresponding points in said circuit, and means mechanically linked to the line following element and responsive to the signals derived from said circuit for controlling the position of the line following element.

2. A line following appartus for generating alternating signals bearing a phase and magnitude relationship corresponding to the position of a line following element relative to a particular line segment comprising a source of illumination, first, second, third and fourth photosensitive devices, means for applying a reference potential to a midpoint between said second and third photosensitive devices and betwen said first and fourth photosensitive devices, means electrically connecting all of said devices in a symmetrical circuit with respect to the reference potential, means for applying an alternating signal balanced with respect to the reference potential to corresponding ones of the photosensitive devices, and means responsive to the signals derived from the symmetrical circuit for controlling the position of the photosensitive devices.

3. Line following apparatus comprising a source of illumination, a plurality of photosensitive devices, a reference potential source connected to a circuit midpoint between the photosensitive devices, means connecting said devices in a symmetrical circuit with respect to the reference potential, means for applying an alternating signal balanced with respect to the reference potential to corresponding ones of the photosensitive devices, means responsive to the signals derived from the symmetrical circuit in order to control the position of the photosensitive devices, and balancing means connected across corresponding outputs of the respective photosensitive devices comprising a potentiometer for balancing the output signal to zero at a predetermined position of the photosensitive devices relative to a line segment being followed.

4. A line sensing device for a line following system comprising a transformer having a center tapped secondary winding, four photocells connected by pairs to opposite ends of said secondary winding, individual resistors connecting the photocells of one pair to a first common output point and the photocells of a second pair to a second common output point, a potentiometer connected between said first and second common output points for providing an adjustable output relative to the respective pairs of photocells, and means for illuminating the photocells so as to generate an output signal indicative of the position of the photocells relative to a line being followed.

5. A line sensing device in accordance with claim 4 wherein the four photocells are arranged in a straight line and equally spaced apart.

6. A line sensing device in accordance with claim 4 wherein the four photocells are symmetrically positioned in two lines which are parallel to but displaced from each other.

7. In a line following system including a recording medium bearing a line to be tracked, a line following head movable with respect to the recording medium comprising a plurality of photosensitive devices having an impedance which is dependent upon incident light intensity, means for applying alternating voltage of opposite polarity to respective pairs of said photosensitive devices, a lamp for illuminating a portion of the recording medium and the line so that light is reflected therefrom to the photosensitive devices, and symmetrical circuit means including a plurality of resistors individually in series with each photosensitive device, the resistance value of those resistors in series with the photosensitive devices more remote from the lamp being less than the resistance value of the resistors in series with the photosensitive devices nearer the lamp, in order to provide a resultant alternating signal having a phase and magnitude indicative of the position of the photosensitive devices with respect to the illuminated portion of the line.

8. Line sensing apparatus for indicating the position of a line relative to a reference point comprising a plurality of photocells interconnected in a symmetrical impedance circuit, means for applying a voltage in opposed polarity relationship to respective ones of said photocells, a source of illumination, a reference potential connected to a midpoint of said symmetrical circuit between corresponding photocells, and means connected to respective points in said circuit symmetrically disposed with respect to said reference potential for sensing the relative impedances of said photocells in order to indicate the position of an illuminated line segment with respect to said reference point, said sensing means comprising a balancing potentiometer connected between the corresponding points of the symmetrical impedance circuit on opposite sides of said midpoint and having a movable arm for adjusting said reference point.

9. Line sensing apparatus for indicating the position of a line relative to a reference point comprising first, second, third and fourth photocells interconnected in a symmetrical impedance circuit, a source of illumination, a reference potential connected to a midpoint of said symmetrical circuit, means for applying a voltage in opposed polarity relationship to respective ones of said photocells comprising a transformer including a secondary winding having a center tap connected to the reference potential and opposite terminals connected to corresponding pairs of the photocells, means connected to respective points in said circuit symmetrically disposed with respect to said reference potential for sensing the relative impedances of said photocells in order to indicate the position of an illuminated line segment with respect to said reference point, said last mentioned means comprising a balancing potentiometer for adjusting said reference point, and a filter network connected to the output of the potentiometer for responding to an A.-C. voltage of the frequency of the transformer voltage.

10. Line sensing apparatus for indicating the position of a line relative to a reference point comprising first, second, third and fourth photocells interconnected in a symmetrical impedance circuit, a source of illumination, a reference potential connected to a midpoint of said symmetrical circuit, means connected to respective points in said circuit symmetrically disposed with respect to said reference potential for sensing the relative impedances of said photocells in order to indicate the position of an illuminated line segment with respect to said reference point including a balancing potentiometer for adjusting said reference point, means for applying a voltage in opposed polarity relationship to respective ones of said photocells comprising a source of D.-C. potential providing voltages of like magnitude but unlike polarity on opposite sides of the reference potential and individually connected to corresponding pairs of said photocells, and means connected to the balancing potentiometer for converting a D.-C. signal to an A.-C. signal of corresponding phase and magnitude.

11. A line following apparatus including a medium bearing a line to be followed, a line following head including a single lamp and a plurality of photocells spatially separated and symmetrically disposed with respect to the lamp, all of said photocells being arranged to respond to light produced by the single lamp, circuit means connected to the photocells for developing a composite signal from the photocells having a magnitude and polarity which are related to the deviation in position of the photocells with respect to the line, first means for producing relative motion between the medium and the head in a first direction, second means for producing relative motion between the medium and the head in a second direction which is substantially transverse to the first direction, and means connected between the circuit means and the second motion producing means for applying the composite signal thereto in order to cause the head to follow the line.

12. A line following apparatus in accordance with claim 11 wherein the line bearing medium comprises a strip chart which is moved adjacent the head by the first motion producing means.

13. A line following apparatus in accordance with claim 11 wherein the line bearing medium comprises a stationary graph and the first motion producing means comprises a carriage movable along the base line of the graph.

14. A line following apparatus in accordance with claim 11 further including voltage generating means mechanically linked to the second motion producing means for generating an output voltage corresponding to the function represented by the line being followed.

15. Line following apparatus in accordance with claim 11 wherein the circuit means includes individual resistors connected in series with corresponding ones of the photocells, said resistors being selected to provide a larger correction signal from the photocells more remote from the lamp than from the photocells nearer the lamp.

16. Function generating apparatus for providing an electrical signal corresponidng to a function represented by a particular line comprising a medium bearing the line, a line following head including a source of illumination and a plurality of photocells spatially separated and disposed on opposite sides of the illumination source, circuit means interconnecting the photocells in a push-pull arrangement in order to develop a composite voltage having a phase and magnitude related to the position of the photocells with respect to the line, first means for producing relative motion between the medium and the head in a direction along the line, second means for producing relative motion between the medium and the head in a direction substantially transverse to the line, and signal generating means including a potentiometer mechanically coupled to the second motion producing means for providing an output signal having a magnitude corresponding to the transverse position of the head.

References Cited by the Examiner

UNITED STATES PATENTS

| | | | |
|---|---|---|---|
| 1,962,467 | 6/34 | Sholkin | 250—209 X |
| 2,074,251 | 3/37 | Braun | 250—202 X |
| 2,173,164 | 9/39 | Housell | 250—209 |
| 2,393,631 | 1/46 | Harrison et al. | 250—209 X |
| 2,565,213 | 8/51 | Falkenstein | 250—209 |
| 2,722,156 | 11/55 | Warren | 250—209 X |
| 2,768,309 | 10/56 | Phillips et al. | 250—209 |
| 2,777,069 | 1/57 | Saeman | 250—209 X |
| 2,933,612 | 4/60 | Cheverton et al. | 250—202 |
| 2,966,621 | 12/60 | Barrett | 250—202 |
| 2,999,938 | 9/61 | Hann et al. | 250—202 |

RALPH G. NILSON, *Primary Examiner.*

RICHARD M. WOOD, ARCHIE R. BORCHELT,
*Examiners.*